United States Patent
diGirolamo

(10) Patent No.: US 8,181,419 B1
(45) Date of Patent: May 22, 2012

(54) CONNECTOR FOR CONNECTING BUILDING MEMBERS

(75) Inventor: Edward R. diGirolamo, Raleigh, NC (US)

(73) Assignee: The Steel Network, Inc., Durham, NC (US)

( * ) Notice: Subject to any disclaimer, the term of this patent is extended or adjusted under 35 U.S.C. 154(b) by 361 days.

(21) Appl. No.: 12/629,979

(22) Filed: Dec. 3, 2009

(51) Int. Cl.
*E04B 1/00* (2006.01)

(52) U.S. Cl. ........ 52/745.19; 52/100; 52/167.1; 52/281; 52/573.1; 52/712; 403/2; 248/909

(58) Field of Classification Search .............. 52/98, 100, 52/167.1, 167.3, 167.4, 281, 573.1, 712, 52/745.19; 403/2; 248/548, 909
See application file for complete search history.

(56) References Cited

U.S. PATENT DOCUMENTS

| | | | | |
|---|---|---|---|---|
| 5,313,752 A | * | 5/1994 | Hatzinikolas | 52/243 |
| 5,467,566 A | * | 11/1995 | Swartz et al. | 52/235 |
| 5,846,018 A | * | 12/1998 | Frobosilo et al. | 403/403 |
| 5,876,006 A | * | 3/1999 | Sharp et al. | 248/297.21 |
| 5,906,080 A | * | 5/1999 | diGirolamo et al. | 52/243.1 |
| 6,213,679 B1 | * | 4/2001 | Frobosilo et al. | 403/403 |
| 6,612,087 B2 | * | 9/2003 | diGirolamo et al. | 52/712 |
| 7,478,508 B2 | * | 1/2009 | Peterson | 52/573.1 |
| 7,503,150 B1 | * | 3/2009 | diGirolamo et al. | 52/702 |
| 2009/0113839 A1 | * | 5/2009 | Carr | 52/712 |

* cited by examiner

*Primary Examiner* — William Gilbert
(74) *Attorney, Agent, or Firm* — Coats & Bennett, P.L.L.C.

(57) ABSTRACT

A connector assembly for accurately projecting fasteners for connecting two building members together while permitting limited relative motion between the members. The assembly includes a plate having one or more longitudinal slots. The plate is secured to or a part of one of the building members. The plate is connected to the other building member by fasteners projected through breakaway washers formed in the slots. The breakaway washers each have an opening for guiding the fastener and centering the fastener on the slot. Centering the fastener on the slot prevents inadvertent clamping of the plate and the other building member together so that limited relative motion is permitted.

21 Claims, 8 Drawing Sheets

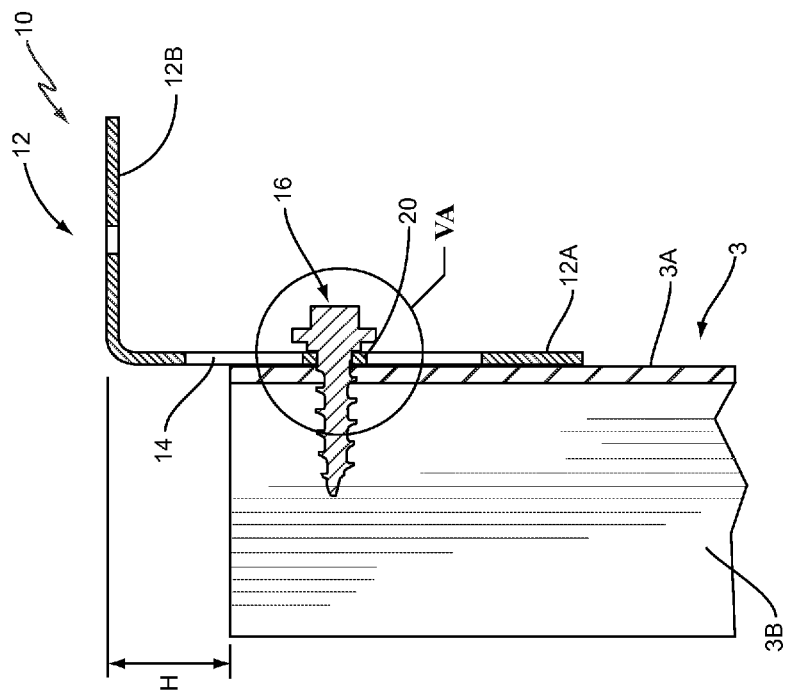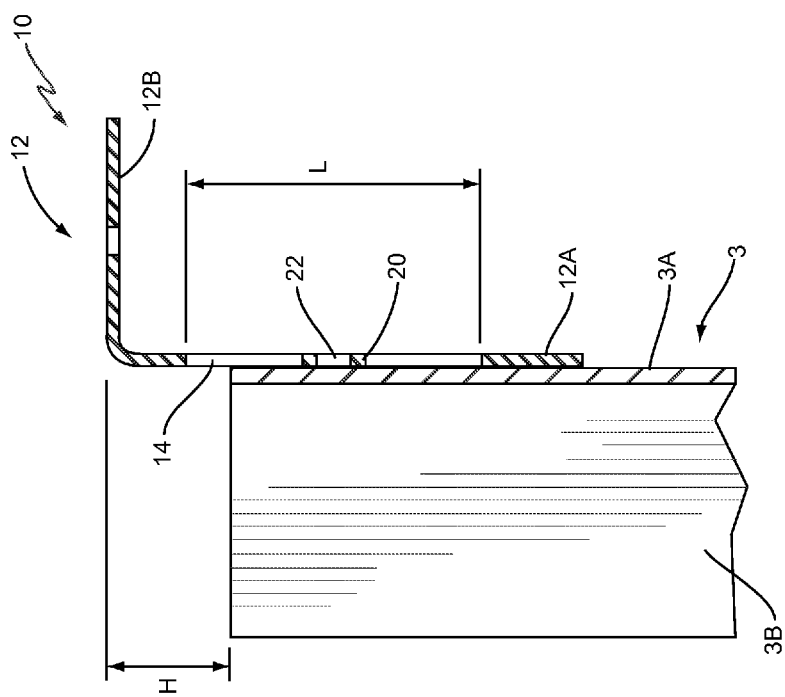

CONNECTOR FOR CONNECTING BUILDING MEMBERS

FIELD OF THE INVENTION

The present invention relates to a means of connecting building members together so the members can move relative to each other in response to dynamic building loads.

BACKGROUND

Movable or slidable construction member connections can be utilized in building design to prevent or limit damage due to varying or dynamic loads. Varying loads can arise from movement of equipment and personnel in the building as well as from environmental factors such as high winds and seismic activity. Flexing of construction members under varying load is expected and acceptable within code-specified limits. However, such flexing often means that some connections between members can cause damage if some relative movement between the connected members is not allowed. The building industry has recognized this problem. Movement between connected members has been accommodated by having sliding connections between the members to permit limited relative movement between the members while keeping the members otherwise securely connected together.

An approach commonly used is that of a slotted connection. In a typical configuration, a connector in the form of a plate or bracket is rigidly secured to or part of one of the members and slidably connected to the other member by means of one or more slots and fasteners. Typically the plate has slots, and shouldered or bushed screws, are projected through slots and into the other member. The screws are tightened to secure the members together but yet permit the members some range of relative sliding movement. The head of the fastener is prevented by the shoulder or bushing from clamping against the connector plate so that the plate can move along the length of the slot. For a more complete and detailed description of such connection devices, reference is made to U.S. Pat. Nos. 5,906,080; 6,612,087; 5,467,566; and, 7,503,150; the disclosures of these patents are expressly included herein by reference.

The degree to which such devices function as intended is dependent upon proper installation. For example, should a shouldered screw be inserted and tightened off center in the slot, the shoulder would overlap and clamp the plate to the member. This clamping would render the connection more or less rigid and not slidable. Avoiding this kind of improper installation requires time and installer dexterity to properly align the screw in the slot.

A need exists for a connection assembly that will provide for easy and accurate screw placement to prevent inadvertent clamping together of the building members being connected and to thus facilitate slidable connection between the members.

SUMMARY OF THE INVENTION

The present invention relates to a connector for connecting two building members together such that the building members can move relative to each other. The connector includes a plate which is defined herein to mean a structure having sufficient surface area to enable the structure to connect two building members. Within the plate or structure is an elongated slot. Secured within the elongated slot is a breakaway washer that includes an opening for receiving a fastener. The fastener projects through the breakaway washer and connects to one of the building members. When a force is applied to the fastener, the force is transmitted to the breakaway washer, causing the breakaway washer to break away from its connection in the slot. This enables the breakaway washer and the fastener to move relative to the slot in the plate. This permits relative movement between the two building members.

Other objects and advantages of the present invention will become apparent and obvious from a study of the following description and the accompanying drawings which are merely illustrative of such invention

BRIEF DESCRIPTION OF DRAWINGS

FIG. 3A is a fragmentary side sectional view of one embodiment of connector assembly including a stud.

FIG. 3B is a fragmentary side sectional view of one embodiment of connector assembly including a stud.

DESCRIPTION OF THE INVENTION

Figure 1:
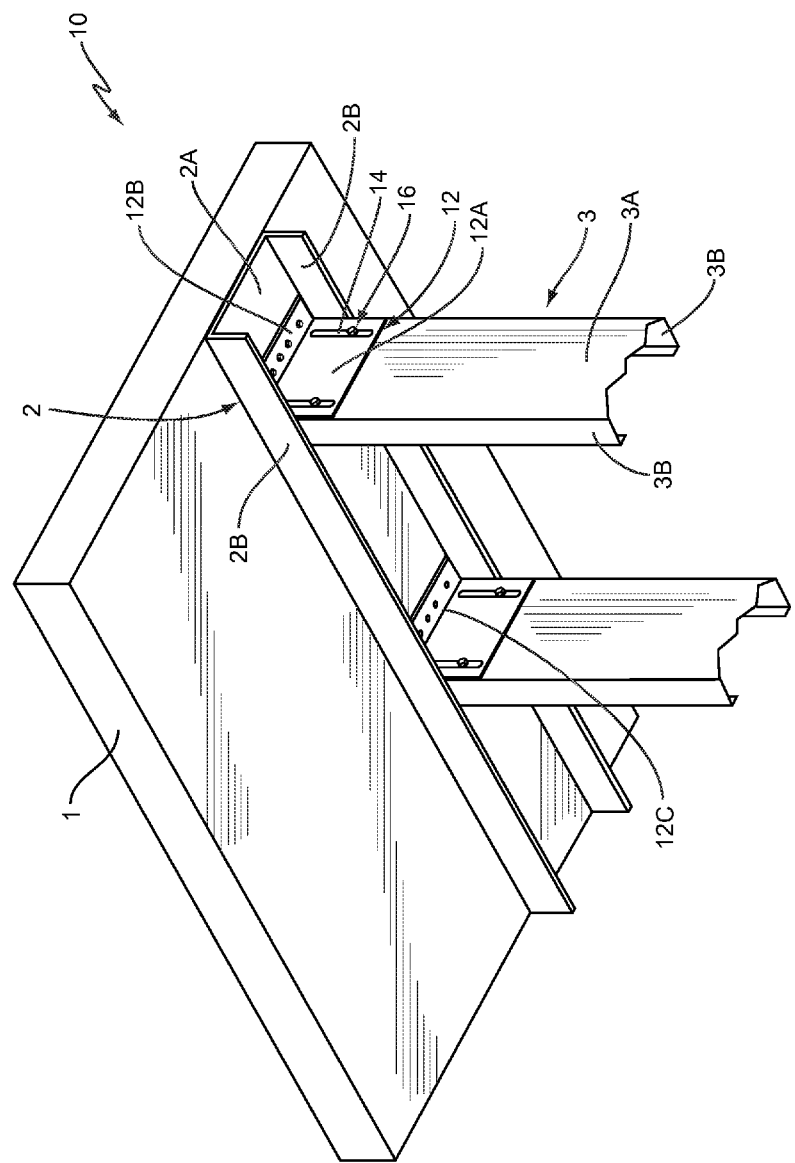
FIG. 1 is a fragmentary perspective view of a portion of a building structure showing one embodiment of the connector assembly in a wall.

With reference to the drawings, the connector assembly of the present invention is indicated generally by the numeral 10. Table 1 contains a listing of the

TABLE 1

| | |
|---|---|
| Reference Numerals and Illustrative Parts | |
| 1 | Overhead building structure |
| 2 | Track |
| 2A | Track web |
| 2B | Track flange |
| 3 | Stud |
| 3A | Stud web |
| 3B | Stud flange |
| 10 | Connector assembly |
| 12 | Plate |
| 12A | Clip web |
| 12B | Clip flange |
| 12C | Clip bend line |
| 14 | Elongated slot |
| 14A | Slot edge |
| 16 | Fastener |
| 16A | Fastener head |
| 16B | Flange of fastener head |
| 16C | Fastener shoulder |
| 16D | Fastener shoulder face |
| 16E | Fastener shaft |
| 20 | Breakaway washer |
| 22 | Centering opening |
| 24 | Breakaway tab | illustrative part names and their respective reference numerals as used throughout the description. Connector assembly 10 is provided to slidably connect together two building members. Included in connector assembly 10 is a plate with one or more elongated slots 14 formed in the plate. See FIG. 6. Each slot 14 formed in the plate has an integral breakaway washer 20 formed therein. Breakaway washer 20 is configured or designed to break away from the slot 14 and once the breakaway washer breaks away from slot 14, it can move back and forth within the slot.

Figure 7:
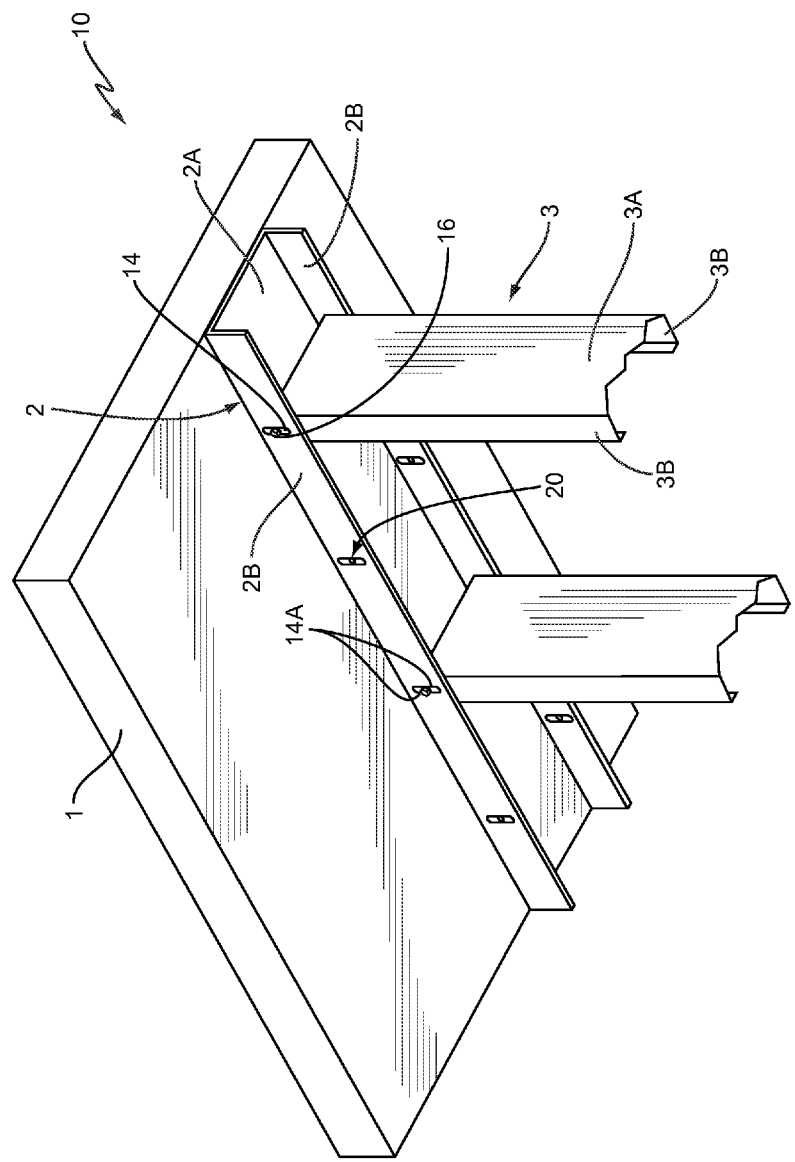
FIG. 7 is a fragmentary perspective view of a portion of a building structure showing one embodiment of the connector assembly in a wall.

Connector assembly 10 further includes a fastener 16 to secure the plate to one of the two building members, cooperating with one of the slots 14 and the breakaway washer 20 formed in the slot to provide a slidable connection between the two building members. FIGS. 1 and 7 show wall structures that include connector assembly 10 connecting a series of studs 3 to a header track 2 that is secured to an overlying floor or roof structure 1.

Figure 5B:
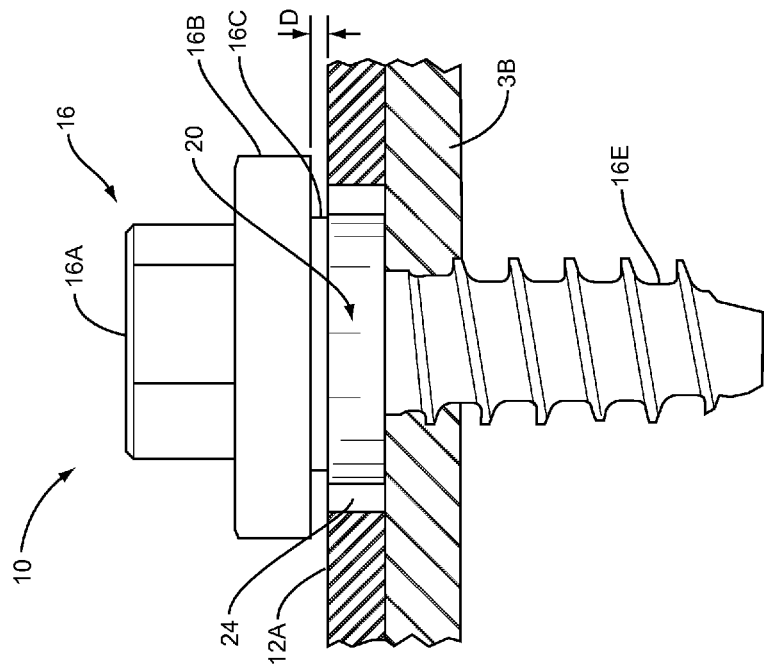
FIG. 5B is a fragmentary front sectional view of one embodiment of the connector assembly including a stud web.
Figure 5A:
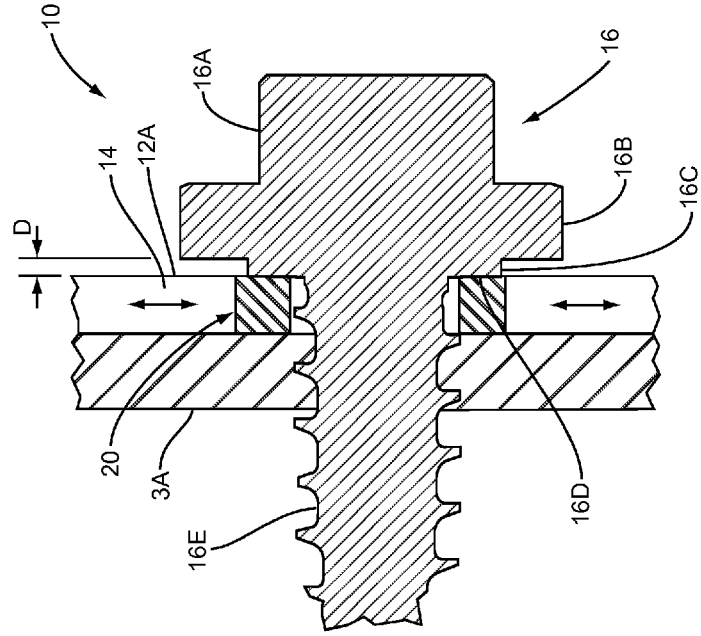
FIG. 5A is a fragmentary side sectional view of one embodiment of the connector assembly including a stud web.
Figure 6:
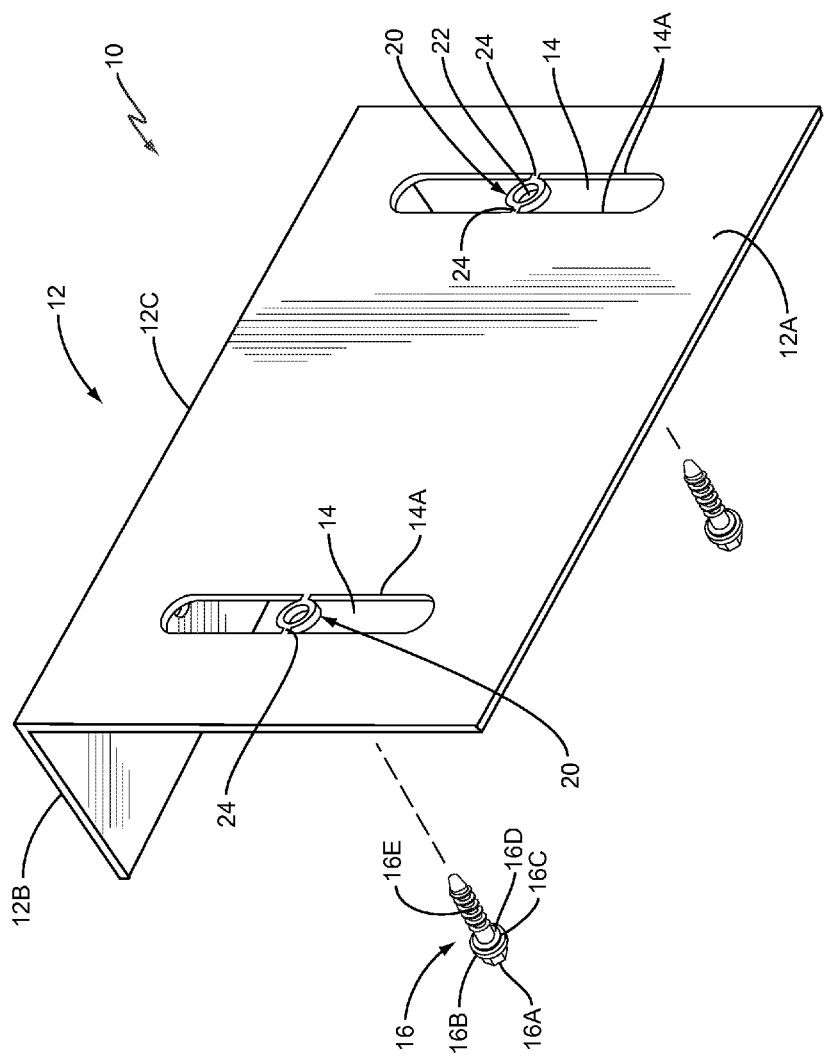
FIG. 6 is an exploded perspective view of one embodiment the connector assembly.

In the embodiment of FIGS. 1-6, connector 10 includes a plate 12 bent in the form of a clip having a clip web 12A and a clip flange 12B disposed at approximately a right angle to the clip web, the bend being about clip bend line 12C. Breakaway washer 20 disposed within slot 14 is connected to an edge 14A by breakaway tabs or connectors 24. Breakaway washer 20 includes a centering opening 22, and the washer is positioned in slot 14 such that the centering opening is generally centered transversely in the slot as shown in FIG. 6. Washer 20 is generally annular, but may be of any peripheral shape such that the width of the washer measured transversely across slot 14 is less than the transverse width of elongated slot 14. Slots 14 with breakaway washers 20, centering openings 22, and breakaway tabs 24 may typically be formed by a conventional stamping operation. Stamping operations producing variously shaped cutouts are well known to those of ordinary skill in the manufacture of metal fabrication components.

Figure 4:
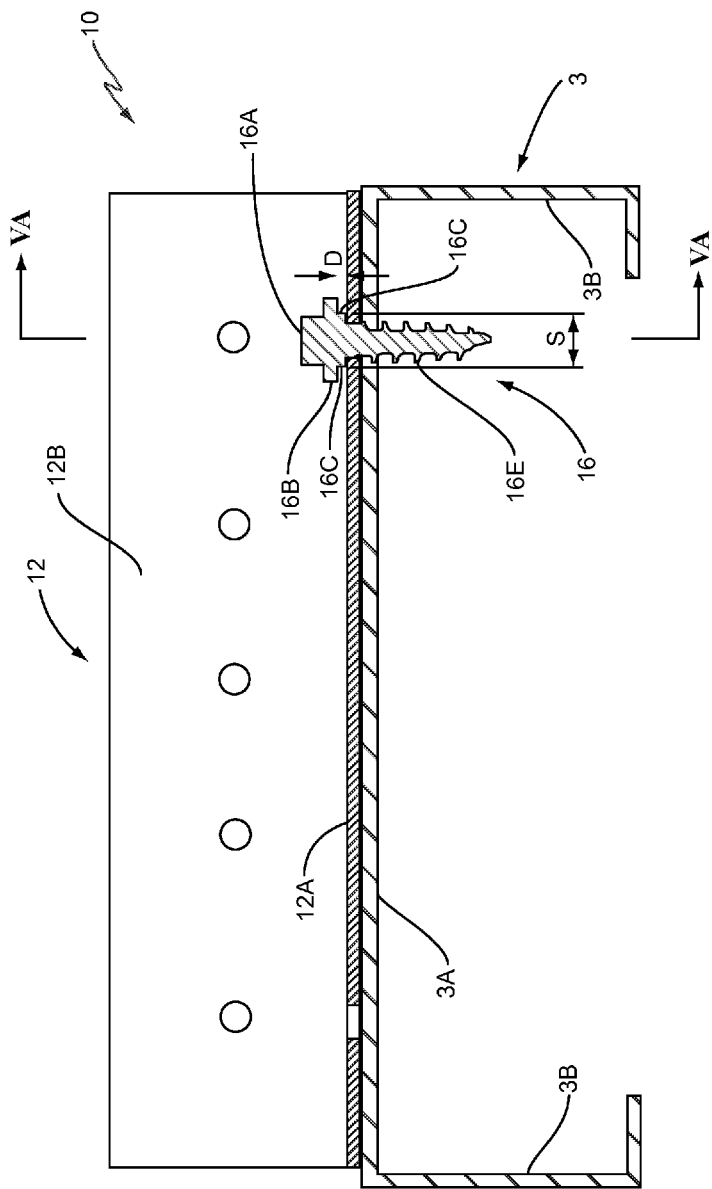
FIG. 4 is a bottom sectional view of one embodiment of connector assembly including a stud.

Each fastener 16 includes a head 16A having a flange 16B, a shoulder 16C having a face 16D, and a shaft 16E projecting away from the face as shown in FIG. 6. Flange 16B defines a periphery enclosing an area that is advantageously wider than the transverse width of elongated slot 14. Shoulder 16C has a height D (see FIGS. 5A and 5B) that provides for a clearance between plate 12, and head flange 16B, when connector assembly 10 is assembled as illustrated in FIGS. 4, 5A, and 5B. Face 16D defines a periphery enclosing an area having a width or diameter S (see FIG. 4) that is advantageously narrower than the transverse width of elongated slot 14. Shaft 16E is generally of a self-drilling, self-tapping design common to conventional sheet metal screws. Fasteners 16 may be formed by well known methods of sheet metal screw fabrication.

When shaft 16E of fastener 16 is guided into centering opening 22 and projected therethrough, face 16D contacts breakaway washer 20 without contacting clip web 12A outside slot 14. With fastener 16 so disposed, head flange 16B extends over clip web 12A outside the slot and is generally spaced away from the web as shown in FIGS. 3B, 4, 5A, and 5B.

Figure 2:
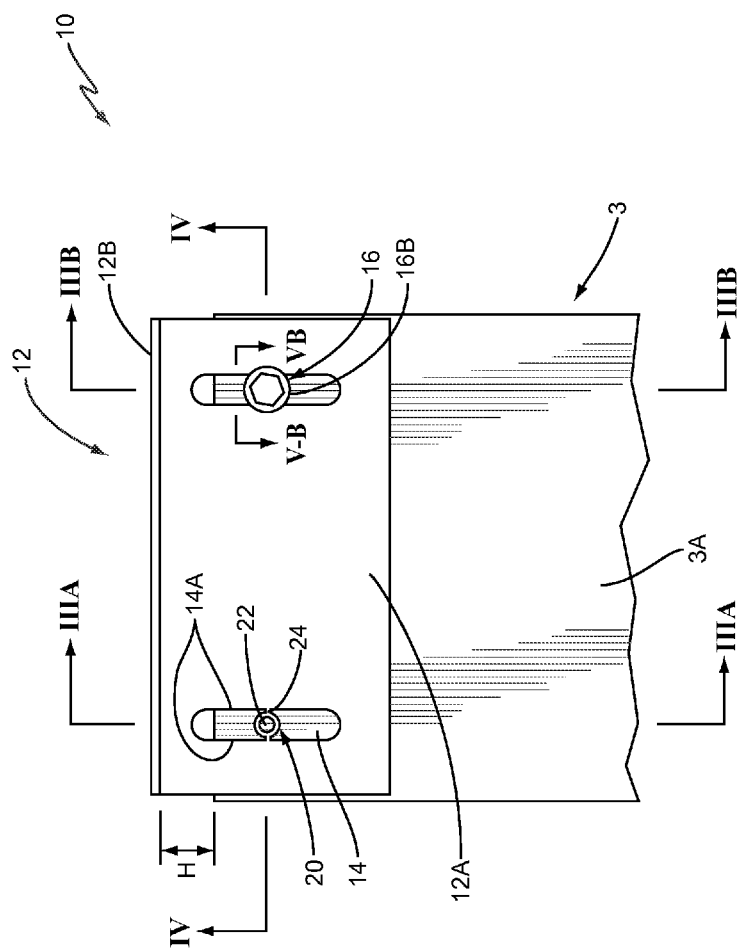
FIG. 2 is a fragmentary front elevation view of one embodiment of a connector assembly including a stud.

Connector assembly 10 may accordingly be configured to connect one of the studs 3 to header or track 2 by the utilization of one of the clips 12 and two of fasteners 16 using the following steps. Each clip flange 12B is secured conventionally to a header web 2A. See FIG. 1. The upper end portion of stud 3 is positioned such that stud web 3A abuts clip web 12A. The upper end of stud 3 is spaced downward from clip flange 12B by a distance H to provide clearance for movement between the stud and header web 2A as shown in FIGS. 2, 3A, and 3B. One of the fasteners 16 is projected through each of the vertical elongated slots 14 in clip web 12A and into stud web 3A. Upon tightening, shoulder face 16D of each fastener 16 will abut one of the corresponding breakaway washers 20 such that the breakaway washer is clamped between the face and stud web 3A as shown in FIGS. 3A, 3B, 5A, and 5B. Flange 16B will overlie but be spaced away from clip web 12A by clearance D due to fastener shoulder 16C, as shown for example in FIG. 4. After washer 20 breaks away from edges 14A of elongated slot 14, header 2 and stud 3 are generally free to move relatively up and down along the length of the slot as indicated by the doubled-arrowed movement lines shown FIG. 5A. However, stud 3 and header 2 are constrained by slot edges 14A against significant horizontal movement transverse to the slot. Likewise significant horizontal movement normal to clip web 12A is constrained by flange 16B.

Figure 8:
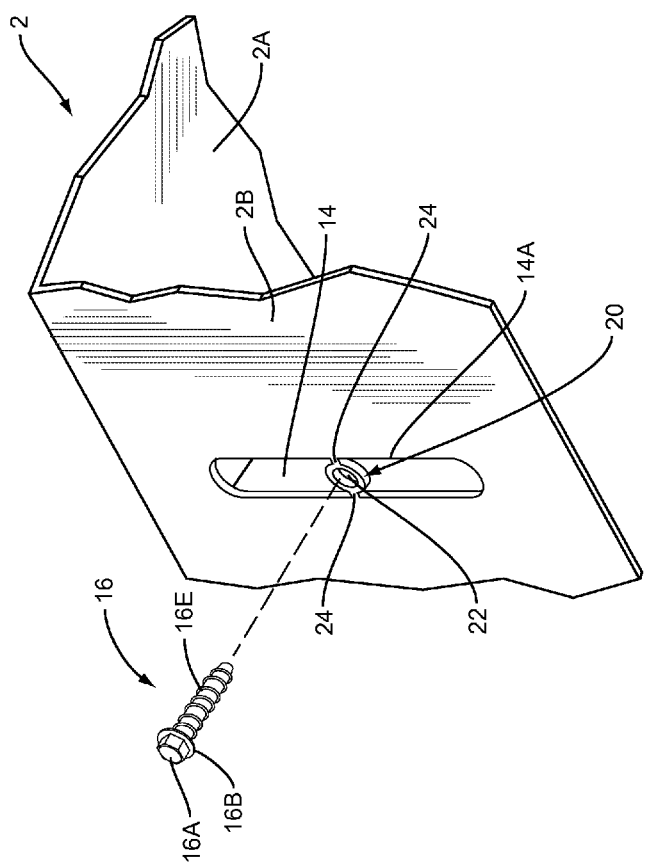
FIG. 8 is a fragmentary perspective view of a header showing one embodiment of the connector assembly.

In the embodiment of FIGS. 7 and 8, stud 3 is connected directly to header 2 without the use of a clip. Header flanges 2B form plates, each plate or flange having a series of vertical elongated slots 14 disposed therein. Each slot 14 has a breakaway washer 20 with opening 22, configured as described above albeit that the slots are formed in header flanges 2B rather than in clips or connectors. To connect one of the studs 3 to header 2, the upper end portion of the stud is positioned between header flanges 2B with the upper end of the stud spaced downwardly from header web 2A. One of the fasteners 16 is aligned with centering opening 22 of one of the breakaway washers 20. Fastener shaft 16E is guided through centering opening 22 and projected into stud flange 3B. Fastener 16 is generally tightened against breakaway washer 20 such that fastener flange 16B remains spaced apart from header flange 2B in the same manner as was described above. After washer 20 breaks away from edges 14A of elongated slots 14, header 2 and stud 3 are generally free to move relatively to each other up or down. However, relative horizontal movement transverse to slot 14 is constrained by slot sides 14A. Relative horizontal movement normal to header flanges 2B is constrained both by the header flanges and flanges 16B of fasteners 16.

It is appreciated that breakaway tabs or connectors 24 provide only minimal connection between each breakaway washer 20 and the plate in which slot 14 is formed. Breakaway tabs 24 are generally designed so as to keep the breakaway washer 20 integral with the plate during pre-construction handling and initial assembly of connector assembly 10. Indeed, breakaway tabs 24 may fail, detaching breakaway washer 20 from its plate under the action of a very small force. Such a force could occur during or after construction. For example, small loads imposed during construction or small dynamic loads due personnel or equipment in the building after construction may give rise to enough force to fracture or break tabs 24. In any event, when washer 20 is broken away, the connection provided by connector assembly 10 becomes a slidable connection. Even if washer 20 is not broken away inadvertently as just described, large externally applied loads such as from wind or earthquake or large dynamic loads due to personnel and equipment in the building cause washer 20 to break away. Once washer 20 of a particular breakaway assembly 10 is broken away, the connection provided to the connected structural members becomes slidable.

Connector assembly 10 may be implemented in various connecting configurations found, in particular, in light metal framed buildings. The embodiments of FIGS. 1-6 and FIGS. 7-8 are but two examples. The appropriate sizing of elements of connector assembly 10 may be accomplished by experiment and/or structural analysis.

The terms "underside," "downward," "upward," "top," "bottom," "upperside," "upper," "horizontal," "vertical", and similar terms or variations of the terms may be used throughout this disclosure. The terms are used merely for illustrative purposes and are not intended to limit the scope of the invention in any way.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of connecting a first building member to a second building member such that the building members can move relative to each other, the method comprising:
    a. disposing a plate adjacent a first building member;
    b. securing the plate to the second building member;
    c. guiding a fastener into a centering opening in a breakaway washer that is formed in an elongated slot in the plate and further inserting the fastener into the first building member;
    d. seating a contact face disposed on the fastener against the breakaway washer;
    e. extending a flange of the fastener over the plate alongside the slot and holding the flange spaced apart from the plate; and
    f. breaking the breakaway washer from the plate, such that the fastener and breakaway washer can move back and forth in the elongated slot.

2. The method of claim 1 wherein the plate is a web of a clip, the clip also includes a flange disposed at approximately a right angle relative to the web, and wherein securing the plate to the second member includes attaching the flange to a web of the second member.

3. The method of claim 1 wherein the plate forms a first flange of the second member and wherein disposing the plate adjacent the first building member includes disposing a portion of the first building member between the first flange and a second flange of the second member.

4. The method of claim 1 wherein the fastener includes a shouldered sheet metal screw, wherein the contact face is formed on the shoulder adjacent a shaft of the screw, and wherein seating the contact face against the breakaway washer includes aligning the contact face with a surface of the breakaway washer.

5. The method of claim 4 wherein extending the fastener flange over the plate alongside the slot and holding the flange spaced apart from the plate includes tightening the fastener until the contact face abuts the surface of the breakaway washer.

6. The method of claim 1 wherein breaking the breakaway washer from the plate includes applying a force to the plate such one or more tabs extending between the breakaway washer and sides of the elongated slot is broken.

7. A connector assembly for connecting first and second building members such that one of the building members can move relative to the other building member, the connector assembly including:
    a. a plate for spanning a portion of the first building member and for being connected to the first and a second building member, the plate having a thickness;
    b. at least one elongated slot formed in the plate, the slot having a width and a length;
    c. a breakaway washer integrally formed in the slot and having a centering opening;
    d. a fastener insertable through the centering opening of the breakaway washer and operative to connect the plate to the first building member, the breakaway washer and centering opening being positioned in the slot so as to center the fastener with respect to the slot; and
    a wherein the breakaway washer is configured such that when the plate is connected to both building members and a force is applied to the plate, the washer will breakaway and permit the fastener to move along the slot such that the first building member can move relative to the second building member.

8. The connector assembly of claim 7 wherein the plate is bent about a bend line such that there are two portions of the plate generally normal to each other, and wherein the at least one elongated slot is oriented generally normal to the bend line.

9. The connector assembly of claim 7 wherein the plate comprises a flange of the second building member.

10. The connector assembly of claim 7 wherein the slot has a generally uniform transverse width; wherein the fastener comprises a screw having a shaft guidable through the centering opening, a head flange having a width greater than the slot width, and a washer contact face spaced from the head flange; and wherein a maximum width of the washer contact face is less than the slot width.

11. The connector assembly of claim 10 wherein the washer contact face of the fastener is spaced away from the head flange by a distance less than the thickness of the plate.

12. The connector assembly of claim 11 wherein the distance is approximately 0.020".

13. The connector assembly of claim 7 wherein the fastener comprises a shoulder screw that includes a shaft guidable through the centering opening, a shoulder having a height less than the thickness of the plate and a maximum width less than the slot width.

14. The connector assembly of claim 13 wherein the distance is approximately 0.020".

15. The connector assembly of claim 7 including at least one breakaway tab formed in the plate and spanning from the breakaway washer to an edge of the elongated slot, the tab configured to break upon the application of a force.

16. The connector assembly of claim 7, wherein the slot includes a surrounding edge and wherein the breakaway washer lies between opposed portions of the surrounding edge; wherein the washer includes a main body having the central opening therein; and wherein the breakaway washer includes at least one connector that projects outwardly from the main body of the washer and connects to a portion of the surrounding edge of the slot.

17. The connector assembly of claim 16, wherein the breakaway washer includes at least two separate connectors that project outwardly from the main body of the breakaway washer and connect to portions of the surrounding edge of the slot.

18. The connector assembly of claim 16, wherein the connector connecting the main body of the breakaway washer with the surrounding edge of the slot is specifically designed to break upon the application of a certain force on the connector, thereby freeing the breakaway washer and enabling the breakaway washer to move in the elongated slot and to move with respect to the plate.

19. A connector assembly for connecting first and second building members such that one of the building members can move relative to the other building member, the connector assembly comprising:

a. a plate for spanning a portion of the first building member and configured to connect the first building member to the second building member;
b. an elongated slot, having a width and a length, formed in the plate;
c. at least one fastener for connecting the plate to the first member;
d. a breakaway washer disposed in the slot of the plate and initially integral with the plate such that the breakaway washer is suspended in a fixed position in the slot;
e. the breakaway washer including a centering opening for receiving the fastener and generally centering the fastener relative to the elongated slot such that when the connector assembly connects the first and second building members together, the fastener projects through the centering opening of the breakaway washer and connects to the first building member;
f. the breakaway washer and plate being configured such that the breakaway washer breaks away from the plate and assumes a free state where the washer can move with respect to the plate and the elongated slot therein in response to a force being applied to the breakaway washer by the fastener; and
g. wherein when the breakaway washer assumes the free state, the breakaway washer and fastener can move relative to the elongated slot in the plate and permit relative movement between the first and second building members.

20. The connector assembly of claim 19, wherein the elongated slot includes a surrounding edge and wherein the breakaway washer lies between opposed portions of the surrounding edge; wherein the breakaway washer includes a main body having a central opening formed therein; and wherein the breakaway washer includes at least one connector that is connected to both the main body of the breakaway washer and the surrounding edge of the elongated slot, and wherein the connector projects outwardly from the main body of the breakaway washer and connects to a portion of the surrounding edge of the elongated slot.

21. The connector assembly of claim 19, wherein the fastener includes a head, a head flange and a washer contact face, and wherein the washer contact face of the fastener engages the breakaway washer in the slot and wherein the contact face is spaced from the head flange such that engagement of the contact face with the washer maintains the head flange in spaced apart relationship with the plate such that when the breakaway washer breaks away and the fastener and breakaway washer move in the slot, the head flange is maintained in a spaced apart relationship with the plate such that the head flange does not engage the plate as the breakaway washer and fastener move in the elongated slot.

* * * * *